L. F. KUHN.
CASING FOR VEHICLE SPRINGS.
APPLICATION FILED APR. 17, 1912.
1,047,660.
Patented Dec. 17, 1912.
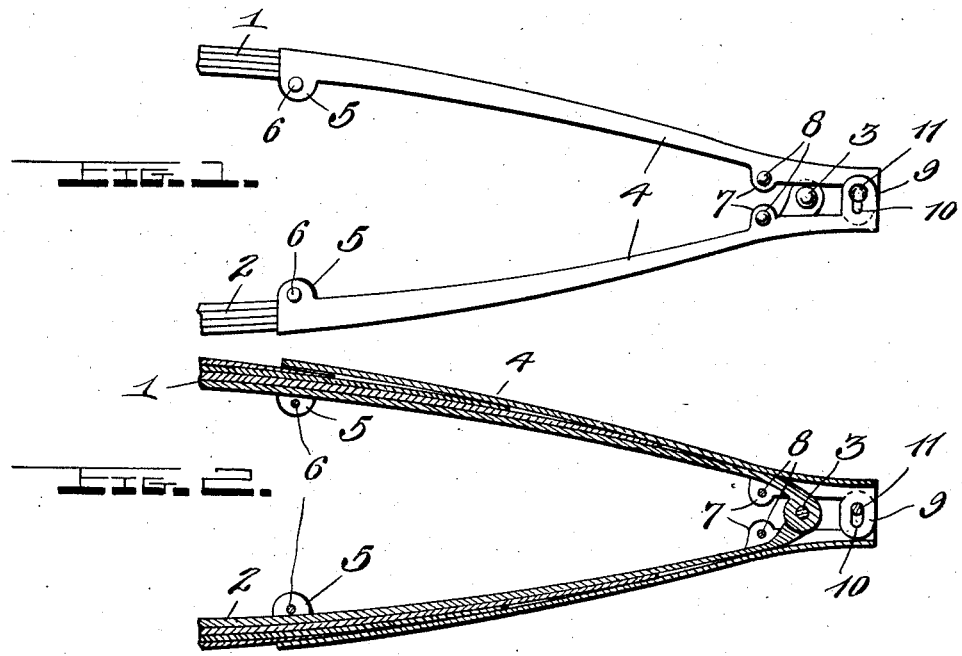
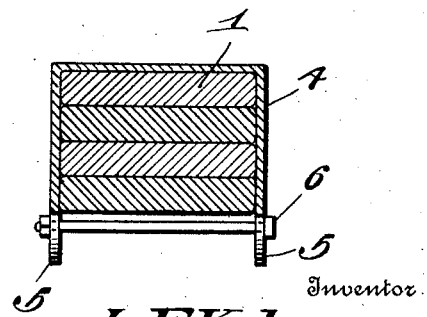
Witnesses
Chas. L. Grieshaber.
A. B. Norton.
Inventor
L. F. Kuhn,
By Watson E. Coleman.
Attorney
COLUMBIA PLANOGRAPH CO., WASHINGTON, D. C.

UNITED STATES PATENT OFFICE.

LOUIS F. KUHN, OF CANANEA, MEXICO.

CASING FOR VEHICLE-SPRINGS.

1,047,660.  Specification of Letters Patent.  Patented Dec. 17, 1912.

Application filed April 17, 1912. Serial No. 691,328.

*To all whom it may concern:*

Be it known that I, LOUIS F. KUHN, a citizen of the United States, residing at Cananea, in the State of Sonora and Republic of Mexico, have invented certain new and useful Improvements in Casings for Vehicle-Springs, of which the following is a specification, reference being had to the accompanying drawings.

This invention relates to new and useful improvements in casings for vehicle springs, the object of the invention being to provide a casing of this character which will act as a shock absorber for absorbing or cushioning the recoil of the springs, especially those used on automobiles, wagons, and other similar vehicles.

Another object of the invention is the provision of a casing adapted to hold the leaves of the spring against relative lateral movement, the present system of fastening the leaves together being to form openings therein for the reception of bolts, which system weakens the spring to a great extent.

A still further object of the invention is to provide a casing of this character which will hold the leaves of the spring together on the rebound and prevent the breaking of the main leaves which often occurs in the present system of holding the leaves of the spring together.

A still further object of the invention is to provide a casing of this character which will possess advantages in points of efficiency and durability, is inexpensive of manufacture and at the same time is simple in construction and operation.

With the above and other objects in view, the invention consists in the novel features of construction and the combination and arrangement of parts, hereinafter more fully described, pointed out in the claims and shown in the accompanying drawings in which, Figure 1 is a side elevation of one end of a vehicle spring showing my improved casing applied thereto. Fig. 2 is a longitudinal sectional view. Fig. 3 is a transverse sectional view.

Referring in detail to the drawings 1 and 2 indicate the upper and lower portion respectively of a vehicle spring, said portions being hingedly secured together at their outer ends by means of the bolt 3. Mounted upon the spring is my improved casing 4, which is channel form in cross section and provided at its inner end with the ears 5, said ears being arranged upon each side of the casing and suitably connected by means of the bolt 6. It will be understood that these ears 5 may be connected by means of a rivet, instead of a bolt, if found desirable. It will be seen that by connecting the sides of the casing by means of the bolt 6, the leaves of the spring will be held securely in place.

Formed upon the casing adjacent its outer end and arranged upon each side thereof are the ears or lugs 7 which are suitably connected together by means of the bolts 8. Formed at the end of the casing and arranged upon each side thereof are the ears 9 which are provided with the elongated openings 10 adapted for the reception of the bolt 11, which suitably connects the ends of the casing and at the same time forms a suitable pivot for the outer ends of the casing. It will be seen that by having the elongated openings 10 formed in the ears 9 at the outer ends of the casings, it will allow the casings to work easily without binding upon the spring.

The casing 4 is preferably formed tapering toward its outer end so as to conform to the shape and size of the vehicle spring, and is applied to the vehicle spring so that the hinged or outer end of the spring is disposed between the bolts 8 and the bolt 11.

From the above description taken in connection with the drawings, it will be readily apparent that I have provided a casing for vehicle springs which not only acts as a shock absorber for absorbing or cushioning the recoil of the springs, but also serves to hold the leaves of the spring together and prevent any relative lateral movement thereof.

It is to be particularly noted that by providing the elongated openings 10 in the end ears 9 with the transverse bolt 11 accommodated in the openings 10, the upper and lower members of the spring will be permitted to yield readily in the compression movement, but when the rebound occurs, as soon as the springs have resumed their normal condition, further movement away from each other will be taken up and absorbed by the members of the casing 4 which will be caused to flex after the parts have assumed the position illustrated in Fig. 2 of the drawing. Hence, the parts are so constructed and arranged that there will be a limited free movement of the upper and lower casing members when the spring is compressed and a limited free movement of said members relative to each other on the recoil or rebound up to a certain point, but when such point is exceeded, the free movement which has been provided for by the elongated openings 10 in the ears 9 will be stopped and further movement of the springs away from each other will be absorbed by the tensioning or flexing action which is imposed upon the casing members 4. As is well known, springs of vehicles are nearly always fractured on the rebound and not in the compression movement, hence, it will be seen that I have provided an efficient device which will tend to effectively lessen or preclude the liability of a fracture, as all of the leaves of the respective upper and lower springs will be held together and caused to move in unison while at the same time, after a certain point has been reached in the expansive or recoil movement, such movement will be absorbed by the tensioning effect which is imposed upon the members of the casing.

What I claim is:—

1. A casing for the purpose described, including members formed at one end with overlapping ears provided with registering elongated openings, and a fastening device accommodated in said elongated openings, said members being designed for application to the upper and lower springs of a vehicle and formed at their opposite ends and intermediate of their ends with means for attaching said members to the springs.

2. The combination with upper and lower vehicle springs connected together at their ends, of a casing embodying members adapted to fit upon said springs, said members being formed at their inner ends and intermediate of their ends with means for attaching them to the springs and being extended at their opposite ends outwardly beyond the point of communication of said springs, the extended ends of said member being formed with overlapping ears having elongated registering slots and a fastening device accommodated in said slots and permitting a limited movement of said ears relative to each other.

3. The combination with the upper and lower springs of a vehicle, of a casing embodying members designed to be applied to said springs, the springs being connected together at one end and the members being rigidly connected to the springs between said end and the opposite end of the springs, said members being extended beyond the first named end of the springs, the extended ends of said members being connected together for a limited movement toward and away from each other.

4. The combination with the upper and lower springs of a vehicle, of a casing embodying channeled members designed to overlap and receive a portion of all of the leaves of the upper and lower springs respectively, said springs being connected together at one end, said members being formed at their inner ends with ears, transversely extending fastening devices secured to said ears for the purpose specified, the members being also formed with extending ears contiguous to the connected ends of the springs, fastening devices extending across the second named ears, said members being extended out beyond the end of the springs and formed in their extended ends with overlapping ears having registering elongated openings formed therein, and a fastening device held in said registering elongated openings, for the purpose specified.

In testimony whereof I hereunto affix my signature in the presence of two witnesses.

LOUIS F. KUHN.

Witnesses:
F. H. ERZINGER,
E. H. BACHMAN.

---

Copies of this patent may be obtained for five cents each, by addressing the "Commissioner of Patents, Washington, D. C."